United States Patent [19]
Cook

[11] Patent Number: 5,818,889
[45] Date of Patent: Oct. 6, 1998

[54] GENERATION OF PHASE SHIFTED CLOCK USING SELECTED MULTI-LEVEL REFERENCE CLOCK WAVEFORM TO SELECT OUTPUT CLOCK PHASE

[75] Inventor: John Wolsey Cook, Ipswich, England

[73] Assignee: British Telecommunications public limited company, London, England

[21] Appl. No.: 928,480

[22] Filed: Aug. 12, 1992

[30] Foreign Application Priority Data

Aug. 15, 1991 [GB] United Kingdom .................. 9117635

[51] Int. Cl.$^6$ .................................................. H04B 15/00
[52] U.S. Cl. ............................ 375/364; 331/45; 363/148
[58] Field of Search ................................ 375/17, 20, 104, 375/285, 364, 293, 351; 328/155; 455/276.1; 327/235, 232, 237, 238, 233, 241; 331/45, 50, 53, 57, 60; 307/13, 16; 363/1, 2, 4, 148, 149, 156

[56] References Cited

U.S. PATENT DOCUMENTS

| | | | |
|---|---|---|---|
| 3,590,386 | 6/1971 | DeJager | 325/321 |
| 3,803,499 | 4/1974 | Malik | 327/238 X |
| 4,010,421 | 3/1977 | Lind | 375/20 |
| 4,379,264 | 4/1983 | Lenhardt | 327/238 X |
| 4,431,969 | 2/1984 | Summers et al. | 327/156 X |
| 4,584,695 | 4/1986 | Wong et al. | 331/45 |
| 4,683,444 | 7/1987 | Kappeler | 331/45 |
| 4,773,083 | 9/1988 | Baumbach et al. | 375/82 |
| 4,823,363 | 4/1989 | Yoshida | 375/20 X |
| 4,943,787 | 7/1990 | Swapp | 331/45 |
| 4,949,364 | 8/1990 | Yukawa | 327/238 X |
| 5,066,868 | 11/1991 | Doy, II et al. | 328/155 X |
| 5,317,288 | 5/1994 | Yung et al. | 327/238 X |

FOREIGN PATENT DOCUMENTS 2183974 6/1987 United Kingdom .

OTHER PUBLICATIONS

EPO Search report.

*Primary Examiner*—Tesfaldey Bocure
*Assistant Examiner*—Bryan Webster
*Attorney, Agent, or Firm*—Nixon & Vanderhye P.C.

[57] ABSTRACT

A phase shifter system includes a number of gates 40, 41 for receiving a reference clock and a number of gates 30–33 for receiving a predicted desired phase. The reference clock is manipulated by latches 43–46 and further gates 48, 49 so as to produce quadrature derivatives and these are connected across the resistor chain R1–R9 to produce multilevel waveforms, the steps being selected by selector 36 connected to the resistor nodes under the control of the predicted phase information from gates 30–33. Filtering and reshaping via comparator 50 provides an output clock pulse of desired phase. The output clock can be used to provide phase control in a transmission/reception system on a communications network.

23 Claims, 4 Drawing Sheets

CLOCK PERIOD

GENERATION OF PHASE SHIFTED CLOCK USING SELECTED MULTI-LEVEL REFERENCE CLOCK WAVEFORM TO SELECT OUTPUT CLOCK PHASE

BACKGROUND OF THE INVENTION

1. Field of the Invention

The invention relates to phase shifting arrangements, typically on a communications network.

2. Related Art

When handling data in a communications system there is often a necessity to adjust the phase for data handling purposes between the exchange and a remote transmitter/receiver. A digital link using echo cancellers may be employed for controlling data phases.

A typical arrangement can be that shown in FIG. 1 albeit the phase shifter 25 in FIG. 1 is of an improved design as depicted in FIG. 2).

A data transmitter 10 remote from the exchange 20 is connected by means of a line 11. A receiver 12 receives data from the exchange over a line 13. A crystal controlled oscillator 14 is connected to receive an output from receiver 12 and the oscillator output is available to both the transmitter and receiver. An echo canceller 15 is provided for cancelling the echo of the transmitted signal at the near end (i.e that generated in transmitter 10). A similar echo canceller 24 is provided at the exchange end.

Also at the exchange end, a receiver 21 and transmitter 22 receive and send to the remote station via the lines 11 and 13.

In order to deal with phase shifts in this network, at the exchange end, an output from the receiver 21 indicative of the phase offset estimate, is made available to a predictor 23, this estimate being either internally computed within the receiver by detecting zero crossings for example, or as a result of an ancillary signal sent from the remote transmitter. The predictor 23 determines the phase requirement necessary for correct operation and this information is received by phase shifter 25. A similar predictor 16 is provided at the remote end.

As a very accurate clock source 28 is already present at the exchange for other purposes, this can be utilised by the receiver 21 via the phase shifter 25 whilst being directly used by the transmitter 22.

The receiver 12, at the remote end, will also provide a phase estimate offset to the crystal controlled oscillator 14. The transmitter 10 and receiver 12 are effectively linked by the oscillator so the desired phase change is effected in both blocks.

However, the receiver 21 at the exchange end is tied to the reference clock source 28 and this can be difficult to adjust to the desired phase within the phase shifter 25. Phase shifters employing Phase Locked Loops (PLL) have been employed in the past, but problems occur especially at higher data rates.

Phase Locked Loops do not cope well with adjusting the phase of the clock driving an echo cancelling transceiver at the exchange end of a higher rate (>basic rate ISDN) digital echo cancelling transceiver. This problem is challenging because the echo canceller is very sensitive to clock jitter. The higher the Baud rate of the transceiver the greater become the problems of jitter since the slope of the echo will be proportional to its bandwidth which in turn is inversely proportional to the symbol period and a given absolute amount of jitter becomes a greater proportion of this symbol period.

The problem is made worse at the exchange end because the local transmit phase from transmitter 22 is constant, (ie does not vary with the received phase at receiver 21) so that the effects of jitter accumulate even if the jitter has a very low bandwidth.

Often a variable crystal oscillator (VXO) is used as part of the PLL to track variations in received phase with low jitter. At high rates the need to keep the VXO jitter very low means that the PLL bandwidth is so low that the capture range may be insufficient to cope with the centre frequency tolerance of the VXO, or that the capture time may become unacceptably long.

BRIEF SUMMARY OF THE INVENTION

The present invention is concerned with providing a phase shifter capable of operating at such higher frequencies (ie >5 MHz).

According to the invention there is provided a phase shifting system including means for receiving a reference clock signal having a predetermined phase, means for manipulating the reference clock to generate at least one multilevel waveform derived therefrom and means for selecting desired levels from said multilevel waveform to provide an output signal of desired phase.

BRIEF DESCRIPTION OF THE DRAWINGS

The invention will now be described by way of example with reference to the accompanying drawings in which.

DETAILED DESCRIPTION OF EXEMPLARY EMBODIMENTS

Figure 1:
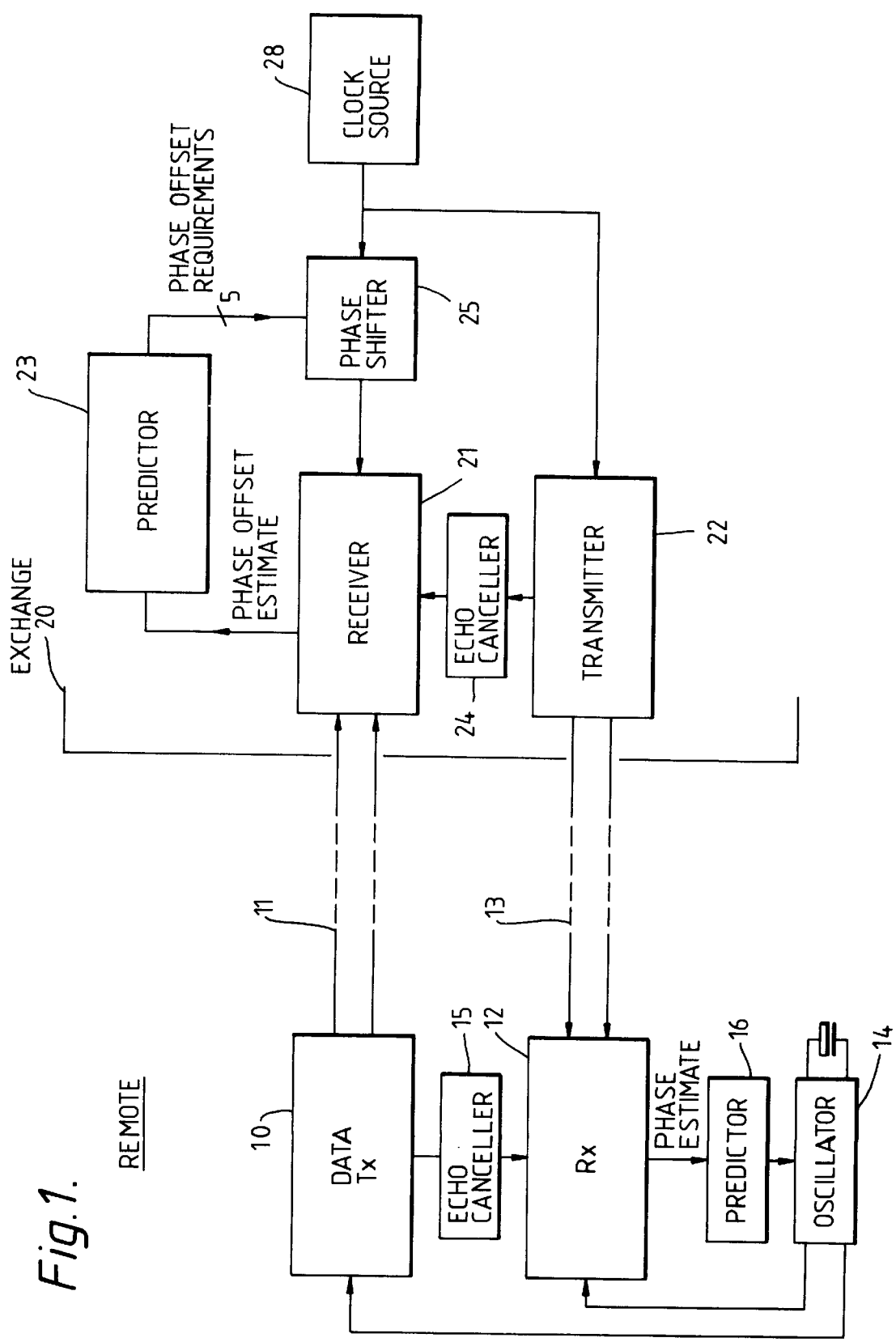
FIG. 1 shows a communications system employing phase shift control.
Figure 2:
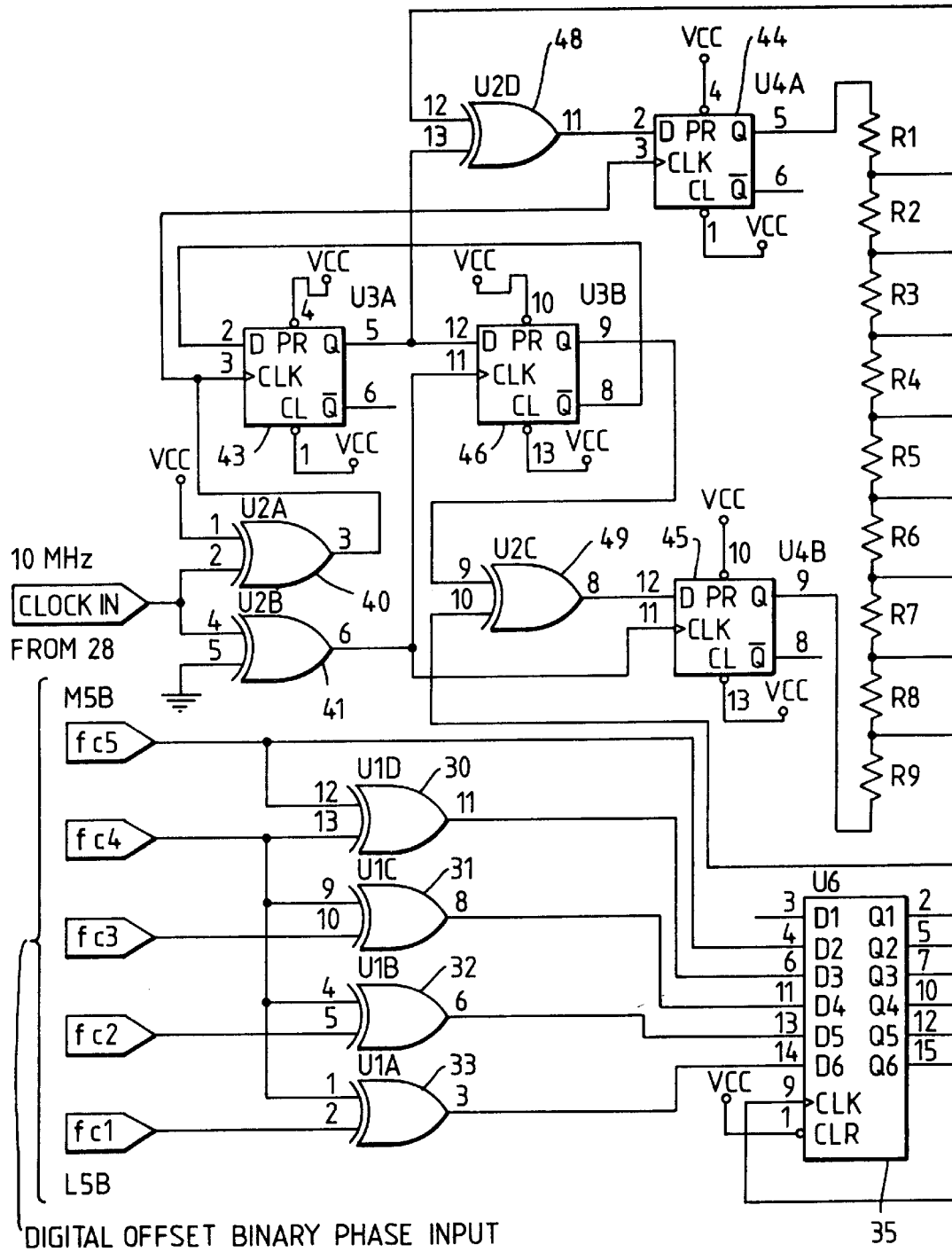
FIG. 2 shows an embodiment of the phase shifter of the invention employed in the FIG. 1 arrangement.
Figure 2:
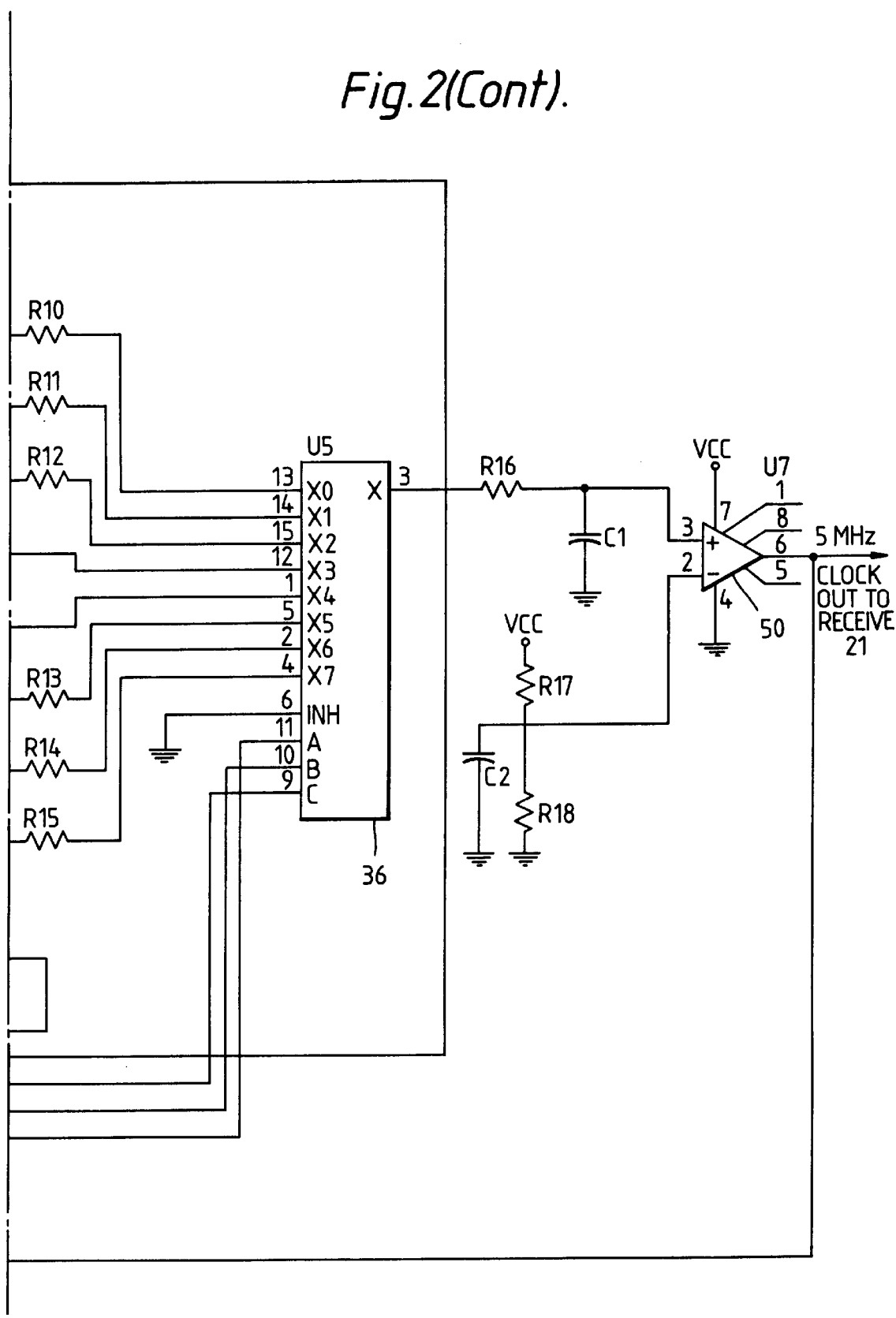

The digital phase shifter has five digital offset binary phase outputs from the predictor 23 (of FIG. 1) and a single clock input (eg 10 MHz) from the exchange clock source 28.

The inputs from the predictor are received by a number of EXOR gates (eg 74HC86) and these are connected to a buffer 35 (eg 74HC174). The buffer output is connected to selection control inputs of a selector 36 (eg HC4051).

The clock from source 28 (of FIG. 1) is received by two EXOR gates 40, 41.

The output of gate 40 is received by latches 43, 44 (eg 74HC74) and that of gate 41 by latches 45, 46. Latches 43 and 46 are interconnected and provide outputs to EXOR gates 48, 49 which are output to latches 44, 45. The output from latches 44 and 45 are connected across cascaded resistors R1–R9. The nodes of the resistors are connected to the inputs to selector 36. The selector output passes via a filter consisting of resistor R16 and capacitor C1 to comparator 50. The comparator output is provided as the output clock to receiver 21 (of FIG. 1). Resistors R17, R18 and capacitor C2 provide the reference to comparator 50.

In operation, the four gates 30–33 receive the five inputs and rearrange the combination to meet the input requirements. In this case, the gates connected to the digital phase inputs convert to the form necessary to drive the system through a monotonic set of phase steps assuming an unsigned binary input. The buffer 35 retimes the control signals to ensure they are synchronous with the output clock from comparator 50.

The input clock to gates 40, 41 is used to generate two quadrature output clocks at half the incoming frequency (eg 5 Mhz) utilising latches 43 and 46. Gates 48, 49 allow the quadrature clocks to be inverted in accordance with phase requirements with latches 44, 45 retiming these to be as required. The outputs are applied to the chain of resistors and the output from one of the nodes is selected via selector 36 in dependence on the control signals from buffer 35.

As the set of de-skew latches in the buffer 35 on the digital phase input are clocked by the output clock, this allows for the propagation delays around the loop (comparator, latches, analogue switch) so as to ensure that by the time the analogue switch operates, the waveform at the input of the comparator is near its positive peak so that any transients are unlikely to generate a glitch at the output.

The potential divider has been elaborated somewhat, inserting resistors R10–R15 in series with six of the outputs, so that whichever is selected by the multiplexer it sees the same source resistance. The impedance of the divider is high with a typical output impedance of nearly 1 kohm (984 ohm). These measures are necessary to ensure that the variations in the output impedance due to mismatch in the multiplexer switch resistances are small enough so that the time constant formed with the filter capacitance does not vary significantly from step to step. About 10 ohms typical resistance mismatch can be expected from the selecter, and about 10 ohms from the divider chain if 1% resistors are used, giving a change in time constant with the 100 pF filter capacitor of 2 ns. This is less than half of the 6.25 ns phase step, so monotonicity can be expected. Thick film hybrid implementation could be used.

The dual D-type latches 43, 46 used for the generation of the quadrature clocks, are clocked from opposite edges of the clock resulting in an overall division ratio of 2. Two alternative quadrature generators could be used; a divide by four circuit in which the D-types are clocked off the same edge of the clock and a "divide by 1" circuit which would make use of a one quarter clock delay line. Only the divide by four circuit is immune to clock mark:space ratio, and the "divide by 1" circuit is affected both by this and tolerances of the delay line.

The selector/multiplexer used gives 8 output phases in each of 4 quadrants, ie 32 different phase steps to complete a full cycle of shift. This would give phase steps of 360°/32 (ie about 11 degrees steps). Resistors R2 to R8 will be of equal value (eg 500Ω) and R1 and R9 of half this value to ensure that there is a nominal phase jump where the voltage is inverted at the opposite ends of the divider.

Figure 3:
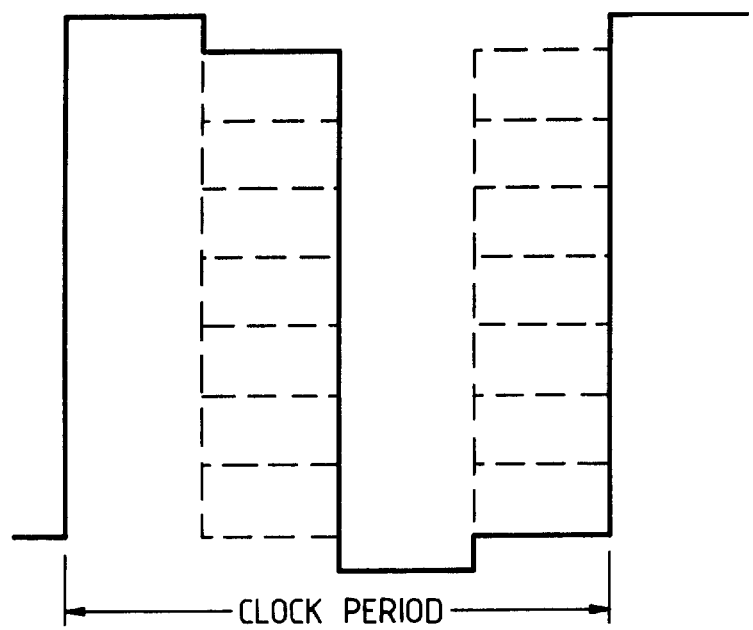
FIG. 3 shows waveforms from one of the four quadrature clocks.

One of the quadrature clocks provided by the circuit at a node on the resistor chain is shown in FIG. 3. The broken lines are representative of the 8 possible levels at the resistors which pass to the selector 36.

The selector output is then filtered. The filter is a first order low pass formed by the output impedance of the voltage divider, the switch resistance (about 100 ohms), and resistor R16 and the capacitor C1. This first order filter will provide a reasonable approximation to the desired signal, while keeping close control over the DC conditions at the input to the comparator.

Figure 4:
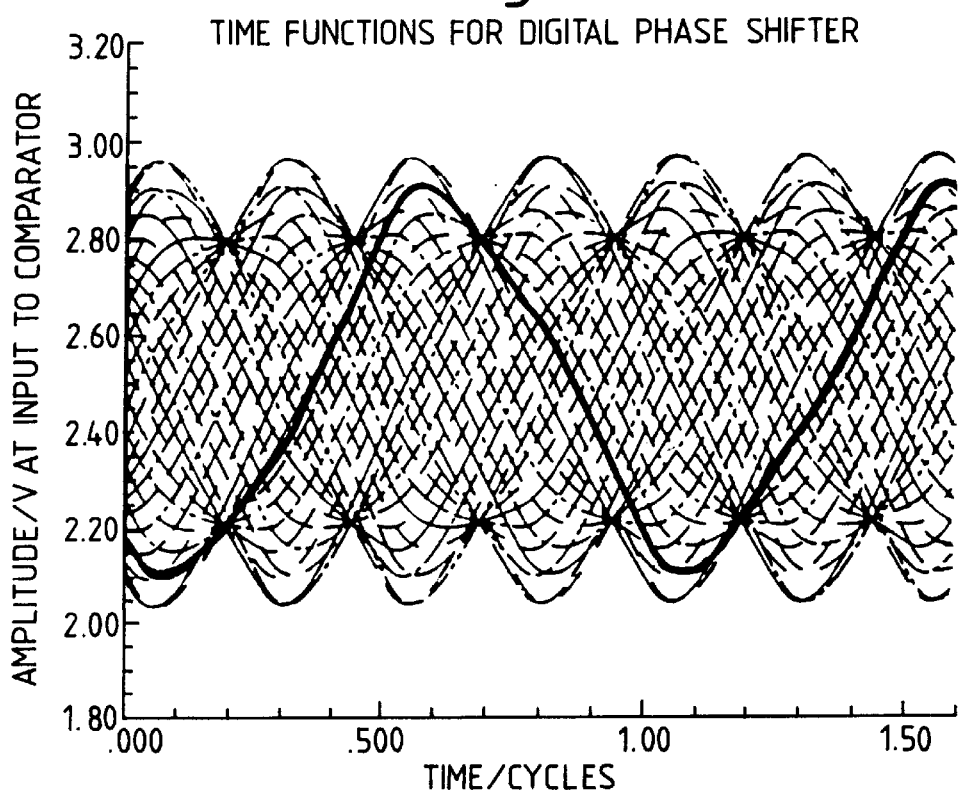
FIG. 4 shows constructed waveforms after filtering.

The waveform following filtering will be a selected one of those shown in FIG. 4, and one of these is shown in bold for the sake of clarity.

After passing to the comparator a square wave of desired phase will be provided.

Thus the digital phase shifter described, allows direct use of the high accuracy exchange clock source and by manipulation of the reference clock, generates multilevel waveforms which can be selected to construct an output signal of desired phase of consistant quality.

I claim:

1. A selectively phase shifting clock signal generating system including:

means for receiving a reference clock signal having a predetermined phase, means for manipulating the reference clock signal to generate a multiplicity of digital waveforms each having spaced apart maximum and minimum amplitude waveform portions, which are of respective common start, finish and amplitude, and therebetween respective different amplitude waveform portions, and means for selecting a desired one of said waveforms and for providing therefrom an output clock signal of desired phase with respect to said reference clock signal.

2. A system as in claim 1 wherein said spaced apart maximum and minimum waveform portions constitute alternate quadrants of the waveforms, the quadrants have a predetermined phase relationship with the reference clock signal, and the means for manipulating is arranged to position said spaced apart maximum and minimum waveform portions in a desired one of the four possible positions.

3. A system as in claim 2 wherein the means for selecting and for providing comprises filter means for receiving the selected waveform and effecting low pass filtering thereon.

4. A system as in claim 3 wherein the means for selecting and for providing further comprises waveshaping means for receiving the low pass filtered waveform and effecting reshaping thereon.

5. A system as in claim 4 wherein the waveshaping means includes a comparator.

6. A selectively phase shifting clock signal generating system including:

means for receiving a reference clock signal having a predetermined phase, means for manipulating the reference clock signal to generate a multiplicity of digital waveforms each having spaced apart maximum and minimum amplitude waveform portions which are of respective common start, finish and amplitude, and therebetween respective different amplitude waveform portion, and means for selecting a desired one of said waveforms and for providing therefrom an output clock signal of desired phase with respect to said reference clock signal, wherein input means are provided for receiving information determining the desired output phase to be selected.

7. A system as in claim 6 wherein the input means includes gating means for providing a control signal to said means for selecting to determine the desired selection.

8. A phase shifting system including:

means for receiving a reference clock signal having a predetermined phase and for converting the received clock signal to a plurality of quadrature clock signals, means for manipulating the plurality of quadrature clock signals to generate a multiplicity of waveforms at the frequency of the quadrature clock signals, each waveform having maximum and minimum amplitude levels interleaved with respective different intermediate amplitude levels and being generated such that the maximum and minimum amplitude levels occur in common respective quadrants defined by the quadrature clock signals, and means for selecting a desired one of the waveforms and for providing therefrom an output signal of desired phase wherein the means for receiving a reference clock signal includes means for converting the received clock signal to a plurality of quadrature clock signals at a submultiple of the received clock frequency.

9. A phase shifting system including:

means for receiving a reference clock signal having a predetermined phase, means for manipulating the received reference clock signal to generate quadrature binary signal streams and their inverses and to select two of said streams and apply them to a pair of latches having a resistor chain connected between the outputs thereof, and means for selecting a node of the resistor chain and for processing the signal obtained therefrom to provide and output signal of desired phase wherein the means for manipulating includes holding means for latching binary signal values therein and a plurality of resistors connected therebetween.

10. A selectively phase shifting clock signal generating system including:

means for receiving a reference clock signal having a predetermined phase, means for manipulating the reference clock signal to generate a multiplicity of digital waveforms each having spaced apart maximum and minimum amplitude waveform portions, which are of respective common start, finish and amplitude, and therebetween respective different amplitude waveform portions, and means for selecting a desired one of said waveforms and for providing therefrom an output clock signal of desired phase with respect to said reference clock signal, wherein the means for selecting includes an analog multiplexer.

11. A communication network for transmitting data between two locations and including a phase shifting system as claimed in claim 1.

12. A phase shifting circuit for providing incrementally selectable phases of an output clock signal at a submultiple frequency of an input clock signal, said phase shifting circuit comprising:

a frequency divider connected to receive an input clock signal and to provide sub-multiple frequency clock signals;

a multiple node resistive voltage divider chain coupled to receive said submultiple frequency clock signals and to provide different multi-level signals at each said node thereof;

a multiplexer connected to receive the multi-level signals at plural nodes of said resistive voltage divider and to pass a selectable one of such multi-level signals as determined by supplied selected signals; and a comparator connected to compare the selected output of said multiplexer with a reference signal and thus to produce a selectively phase-shifted submultiple frequency clock signal output.

13. A phase shifting circuit as in claim 12 including a discrete low pass filter connected between the output of said multiplexer and said comparator.

14. A phase shifting circuit as in claim 12 including phase selection logic circuitry connected to accept a multi-bit phase selection signal and to provide corresponding digital selection signals to said multiplexer.

15. A phase shifting circuit as in claim 14 wherein said selection logic circuitry includes a digital buffer circuit locked by said phase-shifted submultiple frequency clock signal output.

16. A phase shifting circuit as in claim 12 wherein said frequency divider includes latching buffer circuits, clocked by quadrature-phased submultiple frequency clock signals derived from said input clock signal, the outputs from said latching buffers being connected across said resistive voltage divider.

17. A method for providing incrementally selectable phases of an output clock signal at a sub-multiple frequency of an input clock signal, said method comprising:

frequency dividing an input clock signal to provide submultiple frequency clock signals;

processing said sub-multiple frequency clock signals and to provide respectively corresponding different a non-square wave for each clock cycle multi-level signals; and selectively passing one of such a non-square wave for each clock cycle multi-level signals as determined by supplied selected signals to produce a selectively phase-shifted sub-multiple frequency clock signal output.

18. A clock phase shifting method as in claim 17 including low pass filtering of said selectively passed signal followed by comparing the selected signal with a reference signal.

19. A clock phase shifting method as in claim 17 including using a multi-bit phase selection signal to provide corresponding digital selection signals to a multiplexer for effecting said selectively passing step.

20. A clock phase shifting method for providing incrementally selectable phases of an output clock signal at a submultiple frequency of an input clock signal, said method comprising:

frequency dividing an input clock signal to provide submultiple frequency clock signals;

processing said sub-multiple frequency clock signals and to provide respectively corresponding different a non-square wave for each clock cycle multi-level signals;

selectively passing one of such a non-square wave for each clock cycle multi-level signals as determined by supplied selected signals to produce a selectively phase-shifted sub-multiple frequency clock signal output;

using a multi-bit phase selection signal to provide corresponding digital selection signals to a multiplexer for effecting said selectively passing step; and using a digital buffer circuit locked by said phase-shifted sub-multiple frequency clock signal output in said selectively passing step.

21. A clock phase shifting method for providing incrementally selectable phases of an output clock signal at a sub-multiple frequency of an input clock signal, said method comprising:

frequency dividing an input clock signal to provide submultiple frequency clock signals;

processing said sub-multiple frequency clock signals and to provide respectively corresponding different multi-level signals; and selectively passing one of such multi-level signals as determined by supplied selected signals to produce a selectively phase-shifted sub-multiple frequency clock signal output;

wherein said frequency dividing step includes use of latching buffer circuits, clocked by quadrature-phased sub-multiple frequency clock signals derived from said input clock signal, the outputs from said latching buffers being connected across a resistive voltage divider.

22. A selectively phase shifting clock signal generating system including:

means for receiving a reference clock signal having a predetermined phase, means for manipulating the reference clock signal to generate a multiplicity of digital waveforms having (a) a common pulse repetition rate, (b) respective common coincident maximum value portions of the cycles of the waveforms, (c) respective common coincident minimum value portions of said cycles, and (d) respective different values in other portions of said cycles, and means for selecting a desired one of said waveforms to provide an output clock signal of desired phase with respect to said reference clock signal.

23. A selectively phase shifting clock signal generating system including:

means for receiving a reference clock signal having a predetermined phase, means for manipulating the reference clock signal to generate a multiplicity of digital waveforms having (a) a common pulse repetition rate, (b) respective common coincident maximum value portions of the cycles of the waveforms, (c) respective common coincident minimum value portions of said cycles, and (d) respective different values in other portions of said cycles, and means for selecting a desired one of said waveforms to provide an output clock signal of desired phase with respect to said reference clock signal, wherein in each waveform the different values in said other portions of said cycles are k times the maximum value and (1−k) times the maximum value, where k is a respective different coefficient for each said digital waveform.

* * * * *